US010745202B2

(12) United States Patent
Konetzke et al.

(10) Patent No.: US 10,745,202 B2
(45) Date of Patent: Aug. 18, 2020

(54) VACUUM NOSE ROLL (71) Applicant: Kimberly-Clark Worldwide, Inc., Neenah, WI (US)

(72) Inventors: Richard M. Konetzke, Menasha, WI (US); Michael B. Venturino, Appleton, WI (US); Michael Mattioli, Little Chute, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/468,147

(22) PCT Filed: Dec. 16, 2016

(86) PCT No.: PCT/US2016/067088
§ 371 (c)(1),
(2) Date: Jun. 10, 2019

(87) PCT Pub. No.: WO2018/111292
PCT Pub. Date: Jun. 21, 2018

(65) Prior Publication Data
US 2019/0308815 A1 Oct. 10, 2019

(51) Int. Cl.
*B65G 39/02* (2006.01)
*B65G 15/58* (2006.01)
*F16C 13/00* (2006.01)

(52) U.S. Cl.
CPC ............. *B65G 15/58* (2013.01); *B65G 39/02* (2013.01); *F16C 13/00* (2013.01); *B65G 2811/06* (2013.01); *B65G 2812/02217* (2013.01); *F16C 2300/62* (2013.01)

(58) Field of Classification Search
CPC .......... B65G 39/02; B65G 15/58; F16C 13/00
USPC ........................................ 198/689.1
See application file for complete search history.

(56) References Cited

U.S. PATENT DOCUMENTS

| 3,283,045 A | 11/1966 | Thiel |
| 4,025,380 A | 5/1977 | Bernardo |
| 4,602,663 A | 7/1986 | Browning et al. |
| 4,795,335 A | 1/1989 | Farrington et al. |
| 5,102,490 A | 4/1992 | Becker et al. |
| 5,271,304 A | 12/1993 | Wygal et al. |

(Continued)

FOREIGN PATENT DOCUMENTS

| BY | 14896 C1 | 10/2011 |
| EP | 0810172 A2 | 12/1997 |
| JP | 2004224565 A | 8/2004 |

*Primary Examiner* — Douglas A Hess
(74) *Attorney, Agent, or Firm* — Kimberly-Clark Worldwide, Inc.; Brenda L. Ambrosius (57) ABSTRACT Apparatus for transporting material in a manufacturing process are disclosed. A disclosed vacuum conveyer system may comprise a vacuum box extending between a first box end and a second box end, the vacuum box comprising a vacuum box vacuum chamber, a nose roll disposed adjacent to the first box end, the nose roll comprising a nose roll vacuum chamber, and a foraminous member disposed about both of the nose roll and the vacuum box. The vacuum system may further comprise a first airflow conduit connecting the vacuum box vacuum chamber to a vacuum source and a second airflow conduit connecting the nose roll vacuum chamber to the vacuum source.

17 Claims, 5 Drawing Sheets

(56) References Cited

U.S. PATENT DOCUMENTS

| | | | |
|---|---|---|---|
| 5,544,557 A | 8/1996 | Wierschke | |
| 5,810,350 A * | 9/1998 | Pollich | B65H 5/24 271/197 |
| 5,890,301 A | 4/1999 | Marschke | |
| 6,216,848 B1 * | 4/2001 | Zens | B65H 5/224 198/689.1 |
| 6,227,541 B1 * | 5/2001 | Couillard | A61F 13/15756 198/408 |
| 6,254,090 B1 * | 7/2001 | Rhodes | B41J 11/0085 271/265.01 |
| 6,425,512 B2 | 7/2002 | Hill et al. | |
| 6,648,122 B1 * | 11/2003 | Hirsch | B65G 47/848 156/552 |
| 6,733,431 B2 | 5/2004 | Dufour | |
| 6,854,624 B2 | 2/2005 | Vogt et al. | |
| 6,888,143 B2 | 5/2005 | Vogt et al. | |
| 7,293,770 B2 * | 11/2007 | Edinger | B65H 11/005 198/689.1 |
| 7,398,870 B2 * | 7/2008 | McCabe | B65H 5/12 198/377.08 |
| 7,510,069 B2 * | 3/2009 | Koljonen | B65H 20/12 101/233 |
| 7,578,629 B2 * | 8/2009 | Kruijt | B41J 11/0025 248/363 |
| 8,066,282 B2 * | 11/2011 | Muller | B65H 5/021 271/276 |
| 8,100,253 B2 * | 1/2012 | Walsh | A61F 13/15764 198/377.08 |
| 8,293,056 B2 * | 10/2012 | McCabe | A61F 13/15723 156/250 |
| 8,672,323 B2 * | 3/2014 | Blanchard | B41F 13/02 198/689.1 |
| 8,863,939 B2 * | 10/2014 | Panides | G03G 15/657 198/471.1 |
| 9,266,314 B2 * | 2/2016 | Findley | A61F 13/15764 |
| 9,387,131 B2 * | 7/2016 | Andrews | A61F 13/15 |
| 9,573,766 B2 * | 2/2017 | Lenser | B65G 23/06 |
| 9,850,404 B2 * | 12/2017 | Hsieh | B05C 1/08 |
| 9,944,487 B2 * | 4/2018 | McCabe | A61F 13/15723 |
| 10,167,156 B2 * | 1/2019 | Ingole | B65G 29/02 |
| 2007/0074953 A1 | 4/2007 | McCabe | |
| 2008/0149258 A1 | 6/2008 | Downing et al. | |
| 2011/0049209 A1 | 3/2011 | Yamamoto | |
| 2012/0168280 A1 | 7/2012 | Batzer et al. | |
| 2015/0158672 A1 | 6/2015 | Lenser et al. | |
| 2016/0250080 A1 | 9/2016 | Wada | |

* cited by examiner

VACUUM NOSE ROLL

TECHNICAL FIELD

The present disclosure is directed to apparatuses for conveying material.

BACKGROUND OF THE DISCLOSURE

One important process step in the manufacture of many items is the transporting of material along a manufacturing pathway. In the specific case of manufacturing absorbent articles in a continuous process, materials and article components that form part of the produced absorbent articles move along different conveyer systems in the manufacturing process. Processing steps such as bonding steps or application of absorbent material or the like may happen along the manufacturing process to produce the absorbent articles. In some instances, the materials and article components may be transferred between adjacent conveyer systems within the manufacturing process. The hand-off from one conveyer system to the next can be a source of production errors or malfunctions. For instance, the materials and article components may become wrinkled, an edge of the materials or article components may be become folded over, or, particularly in high speed manufacturing processes, air may get under a leading edge of an article component, causing the component to flip, become skewed, or even fly off of the conveyer system. Accordingly, improved conveyer systems for safely and consistently transferring materials and article components between conveyer systems within a manufacturing process are desired.

SUMMARY OF THE DISCLOSURE

The disclosure is directed to several alternative designs and methods of for conveying material.

In a first illustrative example a vacuum conveyer system may comprise a vacuum box extending between a first box end and a second box end and comprising a first discrete vacuum chamber, a nose roll disposed adjacent to the first box end and comprising a second discrete vacuum chamber, and a foraminous member disposed about both of the nose roll and the vacuum box.

In a second illustrative example, the first illustrative example mayer further comprise a single vacuum source which supplies a vacuum to both the first discrete vacuum chamber and the second discrete vacuum chamber.

In a third illustrative example, any of the first or second illustrative examples may further comprise a first vacuum source which supplies a vacuum to the first discrete vacuum chamber and a second vacuum source which supplies a vacuum to the second discrete vacuum chamber.

In a fourth illustrative example, the second discrete vacuum chamber of any of the first through third illustrative examples may be external to the first discrete vacuum chamber.

In a fifth illustrative example, the first box end of any of the first through fourth illustrative examples may comprise an inlet end of the vacuum conveyer system.

In a sixth illustrative example, the second discrete vacuum chamber of any of the first through fifth illustrative examples may be substantially free of obstructions.

In a seventh illustrative example, the nose roll of any of the first through sixth illustrative examples may comprise a dead shaft and a live roll, and a recess within the dead shaft may form the second discrete vacuum chamber.

In an eighth illustrative example, a cross-sectional area of a region bounded by the recess of the seventh illustrative example may comprise between about 25% and about 50% of a cross-sectional area of a portion of the dead shaft not comprising the recess.

In a ninth illustrative example, the live roll of any of the seventh or eighth illustrative examples may comprise a plurality of apertures to allow airflow into the second discrete vacuum chamber, and the apertures may be chamfered.

In a tenth illustrative example, any of the seventh through ninth illustrative examples may further comprise an airflow conduit disposed adjacent to the live roll and a labyrinth seal connecting the live roll to the airflow conduit.

In an eleventh illustrative example, a vacuum conveyer system may comprise a vacuum box extending between a first box end and a second box end, the vacuum box comprising a vacuum box vacuum chamber, a nose roll disposed adjacent to the first box end, the nose roll comprising a nose roll vacuum chamber, a foraminous member disposed about both of the nose roll and the vacuum box, a first discrete airflow conduit connecting the vacuum box vacuum chamber to a vacuum source, a second discrete airflow conduit connecting the nose roll vacuum chamber to the vacuum source.

In a twelfth illustrative example, the second discrete airflow conduit of the eleventh illustrative example may extend at least partially through the vacuum box vacuum chamber.

In a thirteenth illustrative example, the first discrete airflow conduit of the eleventh or the twelfth illustrative example may connect the vacuum box vacuum chamber to a first vacuum source, and the second discrete airflow conduit may connect the nose roll vacuum chamber to a second vacuum source that is separate from the first vacuum source.

In a fourteenth illustrative example, any of the eleventh through thirteenth illustrative examples may further comprise a labyrinth seal between the second discrete airflow conduit and the nose roll.

In a fifteenth illustrative example, the labyrinth seal of the fourteenth illustrative example may comprise a sealing member, and the sealing member may extend around the nose roll for a length equal to between 5% and 25% of the circumference of the nose roll.

In a sixteenth illustrative example, the second discrete airflow conduit of any of the eleventh through fifteenth illustrative examples may comprise an adjustable inlet plate.

In a seventeenth illustrative example, a vacuum conveyer system may comprise a vacuum box extending between a first box end and a second box end, the vacuum box comprising a vacuum box vacuum chamber, a nose roll disposed adjacent to the first box end, the nose roll comprising a nose roll vacuum chamber, and a foraminous member disposed about both of the nose roll and the vacuum box, and wherein the nose roll vacuum chamber is substantially free of obstructions.

In an eighteenth illustrative example, the system of the seventeenth illustrative example may further comprise a first airflow conduit connecting the vacuum box vacuum chamber to a first vacuum source, and a second airflow conduit connecting the nose roll vacuum chamber to either the first vacuum source or a second vacuum source.

In a nineteenth illustrative example, the nose roll of the seventeenth or eighteenth illustrative examples may comprise a dead shaft and a live roll, and a recess within the dead shaft may form the nose roll vacuum chamber.

In a twentieth illustrative example, a cross-sectional area of a region bounded by the recess of the nineteenth illustrative example may comprise between about 25% and about 50% of a cross-sectional area of a portion of the dead shaft not comprising the recess The above summary of some example embodiments is not intended to describe each disclosed embodiment or every implementation of aspects of the disclosure.

BRIEF DESCRIPTION OF DRAWINGS

The aspects of the disclosure may be further understood in consideration of the following detailed description of various embodiments in connection with the accompanying drawings, in which.

Repeat use of reference characters in the present specification and drawings is intended to represent the same or analogous features or elements of the disclosure. Additionally, while the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION OF THE DISCLOSURE

The present disclosure is generally directed towards several alternative designs and methods of for conveying material. In some high speed manufacturing processes, moving materials and article components from one conveyer system to another conveyer system can introduce undesired movement of the materials and article components, from slight skewing of the materials and components with respect to desired positions all the way to complete dislodgment of the materials and components from the conveyer system. Generally, conveyer systems employ vacuum pressure to help keep materials and article components in position on the conveyer as the materials and components move within the system. However, this vacuum pressure can be difficult to localize at front and/or rear ends of conveying systems, thereby making the transition from one conveying system to another conveying system a source of manufacturing problems. The present disclosure relates to vacuum conveying systems with improved abilities for retaining materials and article components on the conveying systems and along the desired conveying paths as the materials and components transition from one conveying system to another conveying system.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

Definitions:

The term "nonwoven" refers herein to materials and webs of material which are formed without the aid of a textile weaving or knitting process. The materials and webs of materials can have a structure of individual fibers, filaments, or threads (collectively referred to as "fibers") which can be interlaid, but not in an identifiable manner as in a knitted fabric. Nonwoven materials or webs can be formed from many processes such as, but not limited to, meltblowing processes, spunbonding processes, carded web processes, etc.

The term "spunbond" refers herein to small diameter fibers which are formed by extruding molten thermoplastic material as filaments from a plurality of fine capillaries of a spinnerette having a circular or other configuration, with the diameter of the extruded filaments then being rapidly reduced by a conventional process such as, for example, eductive drawing, and processes that are described in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Peterson, and U.S. Pat. No. 3,542,615 to Dobo et al., each of which is incorporated herein in its entirety by reference. Spunbond fibers are generally continuous and often have average deniers larger than about 0.3, and in an embodiment, between about 0.6, 5 and 10 and about 15, 20 and 40. Spunbond fibers are generally not tacky when they are deposited on a collecting surface.

The term "superabsorbent" refers herein to a water-swellable, water-insoluble organic or inorganic material capable, under the most favorable conditions, of absorbing at least about 15 times its weight and, in an embodiment, at least about 30 times its weight, in an aqueous solution containing 0.9 weight percent sodium chloride. The superabsorbent materials (SAM) can be natural, synthetic and modified natural polymers and materials. In addition, the SAM can be inorganic materials, such as silica gels, or organic compounds, such as cross-linked polymers.

Figure 1:
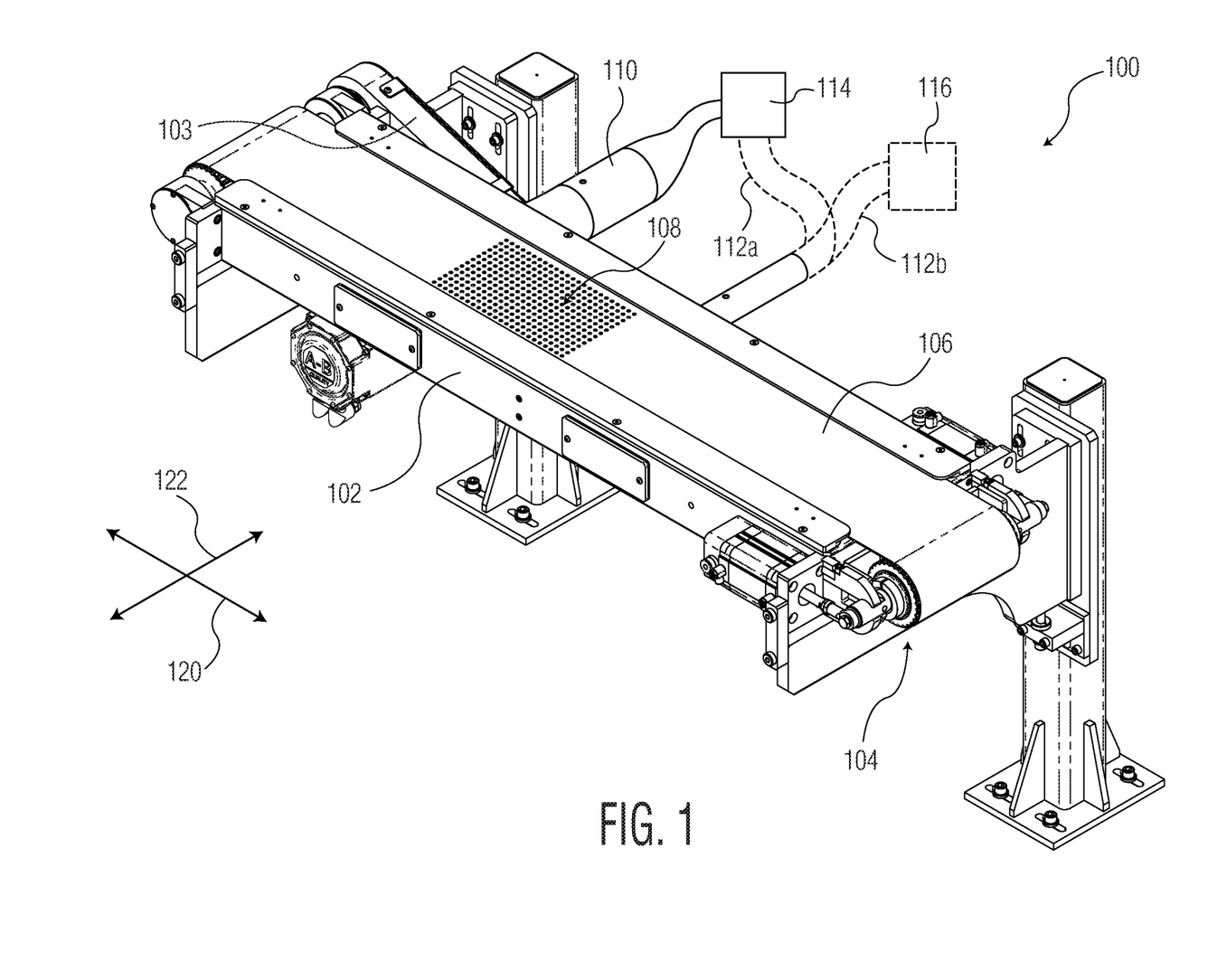
FIG. 1 is a perspective view of a vacuum conveyer system, according to aspects of the present disclosure.

FIG. 1 is a perspective view of vacuum conveyer system 100. Vacuum conveyer system 100 may generally comprise vacuum box 102, vacuum nose roll assembly 104, and moveable belt member 106. Moveable belt member 106 may be driven by belt motor assembly 103, which can drive belt member 106 to move about vacuum box 102 and vacuum nose roll assembly 104 in machine direction 120.

Figure 2:
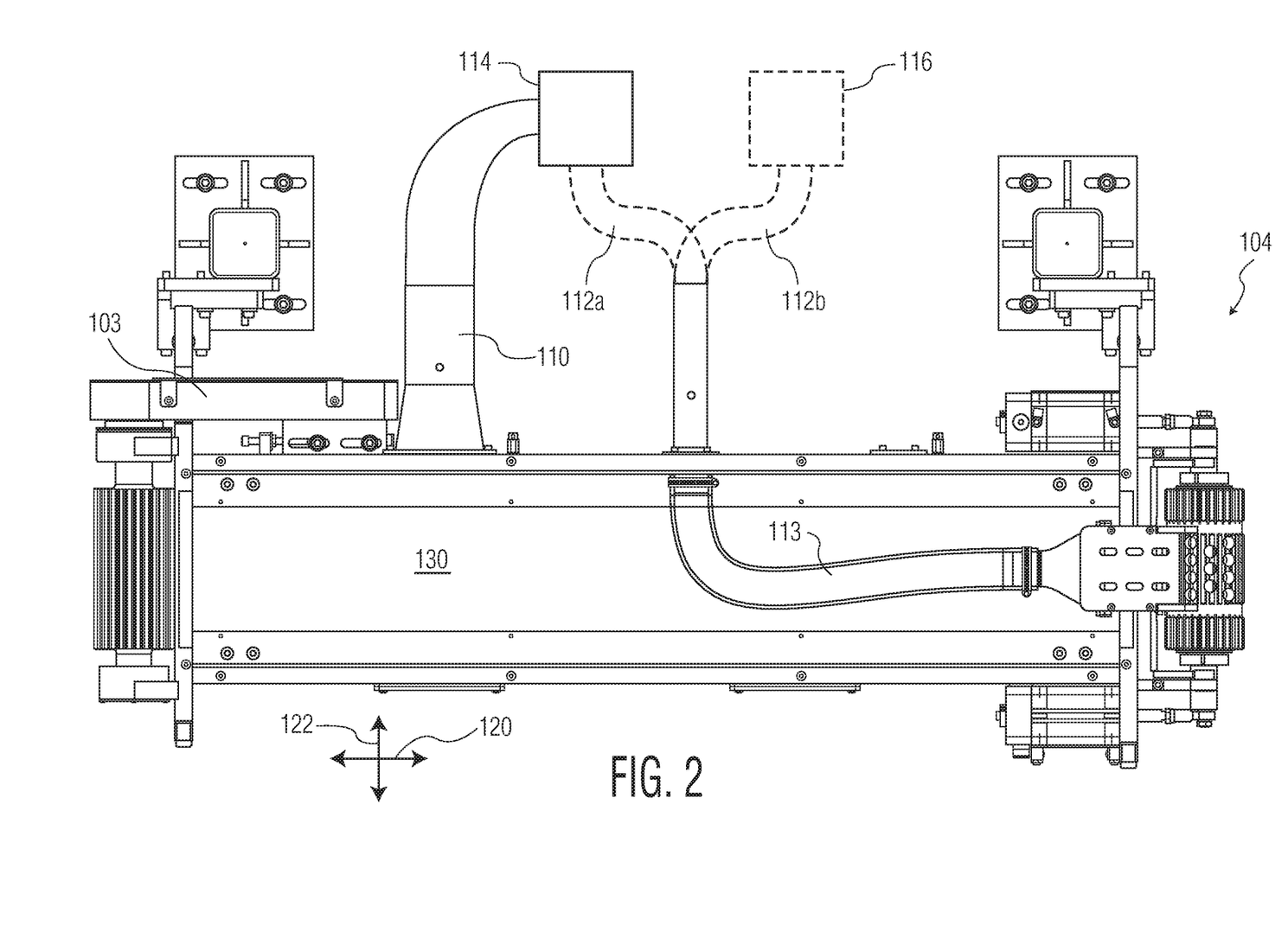
FIG. 2 is a perspective partial view of the vacuum conveyer system of FIG. 1 depicting internal components of the system.

Vacuum box 102 may generally include a hollow interior forming a discrete vacuum box vacuum chamber 130 (as depicted in FIG. 2), and the hollow interior may be connected to airflow conduit 110. Airflow conduit 110, in turn, may be connected to vacuum source 114. In this way, vacuum source 114 can create a pressure differential within vacuum box 102 relative to the space outside of vacuum box 102. In some embodiments, vacuum box 102 may include a porous top surface, which, in combination with vacuum source 114, creates a suction force at the porous top surface of vacuum box 102 as air is pulled into vacuum box 102 due to the pressure differential between the inside of vacuum box 102 and the outside of vacuum box 102. In other embodiments, vacuum box 102 may be enclosed only on three sides while the top is left open. In such embodiments, belt member 106 may act as the top surface of vacuum box 102.

Belt member 106 may generally be comprised of any number of suitable flexible materials, and in some embodiments may comprise a screen. For example, belt member 106 may be comprised of any rubber material having suitable flexible properties enabling belt member 106 to bend around vacuum nose roll assembly 104. Alternatively, belt member 106 may be comprised of any suitable metal material that has the suitable flexibility. In general, these types of belt or screen members are well-known in the art. One important aspect of belt member 106 is that belt member 106 includes porous region 108. As mentioned previously, vacuum box 102 may be configured with vacuum source 114 to create a pressure differential within vacuum box 102 relative to the space outside of vacuum box 102. Porous region 108 of belt member 106 allows air to flow through belt member 106 and into vacuum box 102 due to the pressure differential, thereby creating a suction force at belt member 106. This suction force helps to maintain the positioning of materials and article components being transported on belt member 106.

Although only depicted in FIG. 1 in a small region relative to the size of belt member 106, in other contemplated embodiments porous region 108 may take on any shape or size. For instance, porous region 108 could extend along belt member 106 all the way up to the entire length of belt member 106. Additionally, in FIG. 1, porous region 108 extends approximately along the entire cross-machine direction 122 length of belt member 106. However, in other embodiments, porous region 108 may only extend along a portion of the cross-machine direction 122 length of belt member 106, such as along a cross-machine direction 122 length approximately equal to a cross-machine direction 122 length of materials or article components to be transported on vacuum conveyer system 100.

Figure 4:
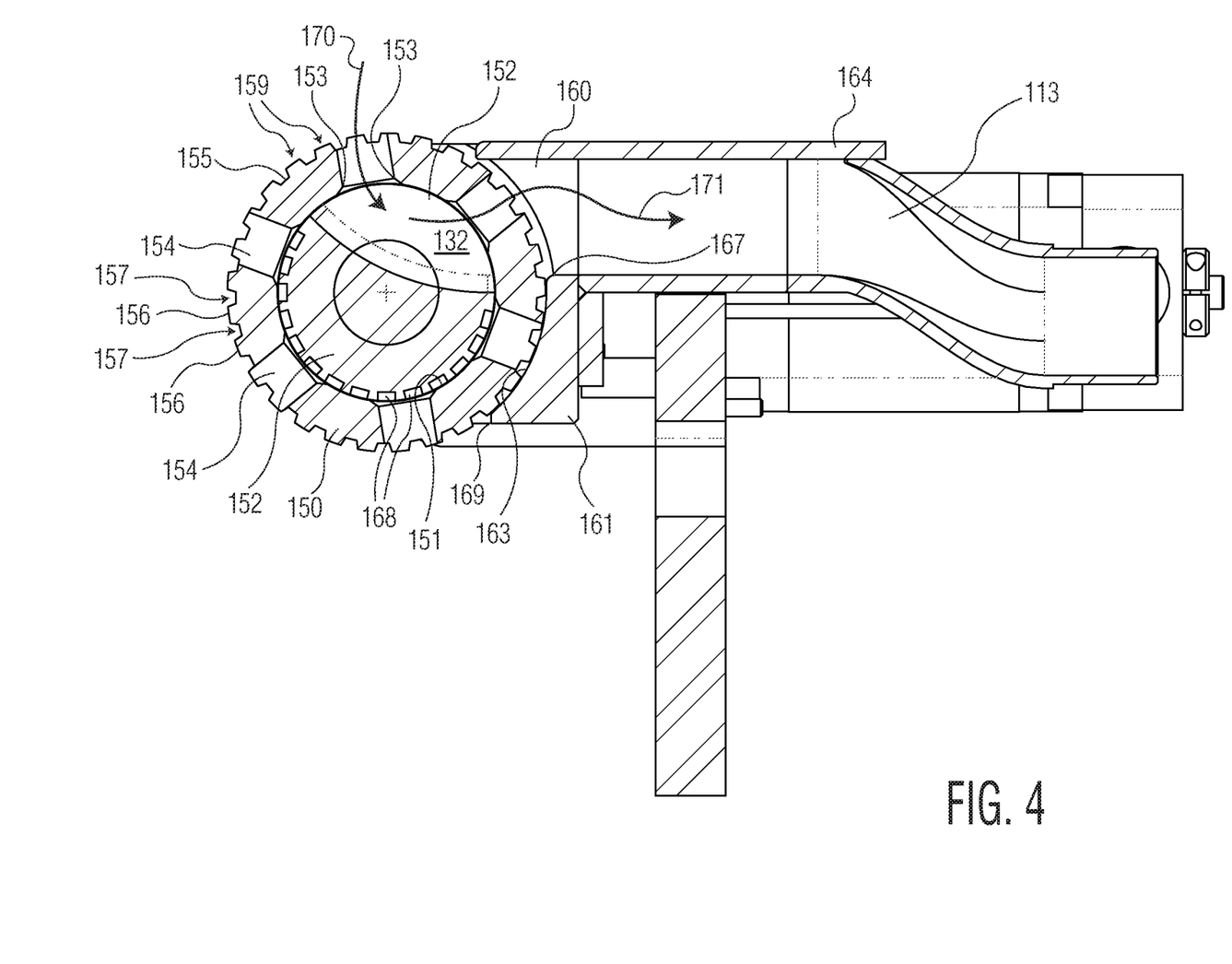
FIG. 4 is a cross-section view of the nose roll assembly of FIG. 3 taken along line 4-4.

Vacuum nose roll assembly 104 may be generally disposed adjacent one end of vacuum conveyer system 100. In some embodiments, vacuum nose roll assembly 104 may be disposed adjacent an inlet end of system 100 where material is brought onto system 100. However, in other embodiments, vacuum nose roll assembly 104 may be disposed adjacent an outlet end of system 100 where material exits system 100. As will be described in more detail below, vacuum nose roll assembly 104 may comprise a discrete nose roll vacuum chamber 132 (as seen in FIG. 4) which is separate and distinct from vacuum box vacuum chamber 130 and not fluidly connected to vacuum box vacuum chamber 130. Vacuum conveyer system 100 may further comprise an airflow conduit that is separate from airflow conduit 110 and which connects vacuum nose roll assembly 104 to a vacuum source. In some contemplated embodiments, system 100 may include airflow conduit 112a which connects vacuum nose roll assembly 104 to vacuum source 114, the same vacuum source that is connected to airflow conduit 110 and vacuum box 102. In other contemplated embodiments, however, system 100 may include airflow conduit 112b which connects vacuum nose roll assembly 104 to vacuum source 116 which is separate from vacuum source 114. In general, vacuum sources 114 and/or 116 may be vacuum pumps, fans, or any other suitable energy source configured to provide airflow out of vacuum box vacuum chamber 130 and nose vacuum chamber 132. Vacuum sources 114 and/or 116 may be configurable to provide adjustable pressure differentials within vacuum box vacuum chamber 130 and/or nose roll vacuum chamber 132. In other embodiments, airflow conduits 110 and/or 112a, 112b may include one or more dampers which can be adjusted to provide different pressure differentials within vacuum box vacuum chamber 130 and/or nose roll vacuum chamber 132.

The presence of distinct vacuum box vacuum chamber 130 and nose roll vacuum chamber 132 allows for greater control of the pressure differentials within each chamber 130, 132. This greater control may help to ensure that transported materials and article components maintain their position as they travel a path through a manufacturing process, both along a vacuum conveyer system such as system 100 and during transitions between adjacent conveyer systems.

FIG. 2 is a perspective view of the vacuum conveyer system of FIG. 1 with belt member 106 removed. As can be seen in FIG. 2, airflow conduit 112a (or 112b) connecting vacuum nose roll assembly 104 to one of vacuum sources 114, 116 may further connect to airflow conduit 113 which extends at least partially through vacuum box vacuum chamber 130. Although shown vacuum box vacuum chamber 130 is depicted as a single chamber, in other embodiments vacuum box vacuum chamber 130 may comprise two or more vacuum chambers with additional airflow conduits connecting each vacuum chamber to a vacuum source (or the same vacuum source in some embodiments). In still other contemplated embodiments, vacuum chamber 130 may comprise any suitable number of chambers, such as between 1 chamber and 5 chambers.

As described previously, vacuum conveyer system 100 may be suitable for transporting materials and article components used in the manufacture of absorbent articles. Example materials that vacuum conveyer system 100 may transport include webs constructed of any of a variety of materials, such as synthetic fibers (for example, polyester or polypropylene fibers), natural fibers (for example, wood or cotton fibers), a combination of natural and synthetic fibers, porous foams, reticulated foams, apertured plastic films, or the like. Such materials may be in the form of various woven and non-woven fabrics which can include spunbond fabric, meltblown fabric, coform fabric, carded web, bonded-carded web, bicomponent spunbond fabric, spunlace, or the like, as well as combinations thereof.

Vacuum conveyer system 100 may also be suitable for transporting absorbent article components such as absorbent cores. Exemplary absorbent cores may be comprised generally of pulp fluff, SAM, or pulp fluff combined with SAM. Vacuum conveyer system 100 may be particularly useful in transporting materials and article components that are thin and flexible, for example absorbent cores that are equal to or greater than 75% of SAM by weight.

It should be understood that although the examples used herein describing materials that may be transported by vacuum conveyer system 100 include materials and articles used in the production of absorbent articles, these specific uses do not limit vacuum conveyer system 100 in anyway.

Rather, vacuum conveyer system 100 may be suitable for transporting any suitable material, component, or product.

In order to successfully transport such materials and article components, for instance ensuring the materials and article components maintain their positions as they travel throughout the manufacturing process, vacuum source 114 (and possibly 116) may be configured to provide specific pressure differentials within vacuum box vacuum chamber 130 and nose roll vacuum chamber 132 (as seen in FIG. 4). In some embodiments, vacuum source 114 (and possibly 116) may be fans rated at between about 1,000 cubic feet per minute (CFM) and about 10,000 CFM. Such vacuum source (s) may be able to create pressures of between about 0.5 inch of water (0.125 kPa) and about 100 inches water (25 kPa) within vacuum box vacuum chamber 130 and within nose roll vacuum chamber 132. In other embodiments, vacuum source 114 (and/or 116) may be able to create pressure of between about 1 inch of water (0.25 kPa) and about 10 inches of water (25 kPa) within vacuum box vacuum chamber 130 and within nose roll vacuum chamber 132.

Figure 3:
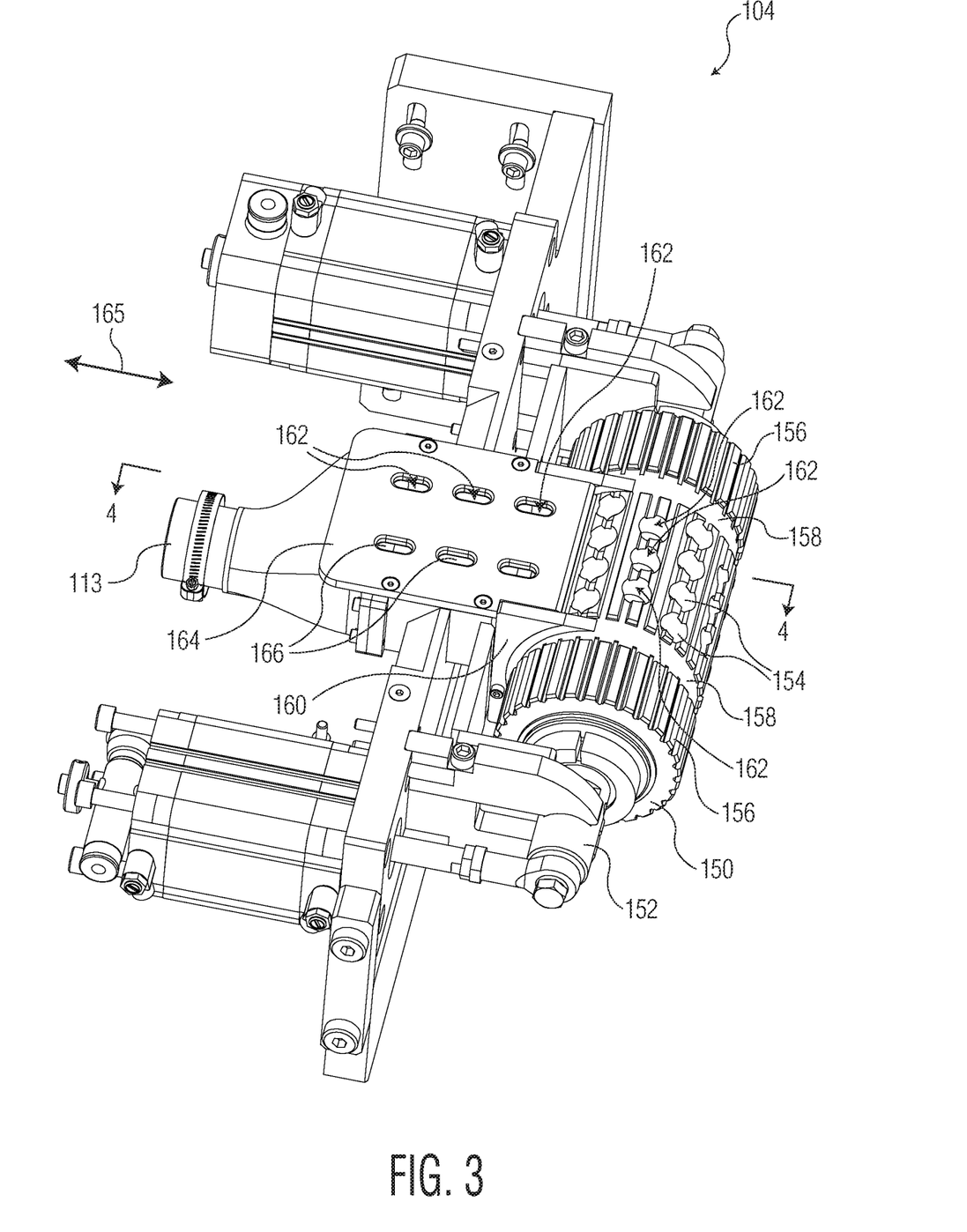
FIG. 3 is a perspective view of a nose roll assembly of the vacuum conveyer system of FIG. 1, according to aspects of the present disclosure.

FIG. 3 is a perspective view of nose roll assembly 104 of vacuum conveyer system 100. Nose roll assembly 104 generally comprises nose roll 150 and nose roll shaft 152. Nose roll 150 and nose roll shaft 152 are configured in a live-roll-dead-shaft configuration where nose roll shaft 152 maintains its rotational position throughout operation of vacuum conveyer system 100, and nose roll 150 rotates about nose roll shaft 152 during operation of vacuum conveyer system 100.

Nose roll 150 generally comprises apertures 154, ridges 156, and smooth areas 158. Apertures 154 may allow air to flow through nose roll 150 and into nose roll vacuum chamber 132 (as seen in FIG. 4), as evidenced by airflow paths 162. Ridges 156 may cooperate with sealing member 161 (as can be further seen in FIG. 4) to provide a seal between airflow conduit 113 and nose roll 150. Similarly, smooth areas 158 may cooperate with sealing members 160 in order to provide a seal between airflow conduit 113 and nose roll 150.

In at least some embodiments, nose roll assembly 104 may further include adjustable inlet plate 164. In these embodiments, adjustable inlet plate 164 may cover a portion of airflow conduit 113 and may further comprise apertures 166. For example, adjustable inlet plate 164 may be a top portion of airflow conduit 113, and apertures 166 may allow air to enter airflow conduit 113, as depicted by air flow paths 162, thereby providing a suction force along adjustable inlet plate 164. In this way, vacuum conveyer systems 100 that include adjustable inlet plate 164 may provide a suction force on materials and article components as they pass over nose roll assembly 104 and transition past nose roll assembly 104 but before they pass over vacuum box vacuum chamber 130. In at least some embodiments where vacuum conveyer system 100 includes adjustable inlet plate 164, adjustable inlet plate 164 may be moveable in the direction of arrows 165. Moving adjustable inlet plate 164 along a path aligned with arrows 165 may adjust both a positioning of the suction force due to the changing of location of apertures 166 (and/or opening a gap between nose roll 150 and adjustable inlet plate 164) and the level of suction force within airflow conduit 113 at adjustable inlet plate 164. In other embodiments, plate 164 may be adjustable in a direction different than depicted by arrows 165, for example aa direction having any angle with respect to arrows 165. In some of these embodiments, plate 164 may comprise a pair of plates with aligned apertures. Moving the top plate of the pair in any direction may un-align the apertures of each of the pair of plates, thereby adjusting the suction strength along plate 164.

FIG. 4 is a cross-section view of nose roll assembly 104 taken as viewed along line 4-4. As can further be seen in the profile view of FIG. 4, vacuum nose roll 150 comprises apertures 154 and ridges 156. Apertures 154 of vacuum nose roll 150 may fluidly connect the exterior of vacuum nose roll 150 with the interior of vacuum nose roll 150 and with airflow conduit 113. As described above, vacuum source 114 (and/or 116) may be connected to airflow conduit 112, which connects to air flow conduit 113. Accordingly, when vacuum source 114 (and/or 116) is in operation, air may move from the exterior of vacuum nose roll 150 to the interior of vacuum nose roll 150 through one or more apertures 154 and into nose roll vacuum chamber 132, as depicted by arrow 170. Nose roll vacuum chamber 132 may be formed by a recess of nose roll shaft 152. The air that entered nose roll vacuum chamber 132 may additionally move out of nose roll vacuum chamber 132 through one or more additional apertures 154 and into airflow conduit 113 due to the action of vacuum source 114 (and/or 116), as shown by arrow 171. In this manner, vacuum source 114 (and/or 116), airflow conduits 113, 112, and nose roll assembly 104 may be configured to achieve a suction force at the outer surface of vacuum nose roll 150. In at least some embodiments, apertures 154 may have chamfered inner edges 153 in order to help create smooth airflow into nose roll vacuum chamber 132. In other embodiments, instead of chamfered inner edges 153, apertures 154 may comprise angled walls such that apertures 154 widen from as they extend toward nose roll vacuum chamber 132.

Vacuum nose roll 150 may comprise both ridges 156 and recesses 157 and may further be described as having both a minor diameter and a major diameter due to ridges 156 and recesses 157. In this manner, vacuum nose roll 150 may comprise both surfaces 155, which may be the surface of the minor diameter of vacuum nose roll 150, and surfaces 159 which may be the surface of the major diameter of vacuum nose roll 150.

Surfaces 159 may be the outer most portion of ridges 156, and ridges 156 may interact with sealing member 161 in order to form a seal between vacuum nose roll 150 and airflow conduit 112. For example, ridges 156 and sealing member 161 may be configured such that there is a very small-to-no gap between surfaces 159 and sealing member 161 as ridges 156 pass adjacent to sealing member 161. This close fit forms a seal between vacuum nose roll 150 and airflow conduit 113 to help prevent air entering airflow conduit 113 from locations other than through vacuum nose roll 150 and nose roll vacuum chamber 132. Locations where air enters airflow conduit 113 from locations other than through vacuum nose roll 150 and nose roll vacuum chamber 132 may be thought of as "leaks". For instance, air entering airflow conduit 113 from locations other than through vacuum nose roll 150 and nose roll vacuum chamber 132 reduces the amount of pressure differential vacuum source 114 (and/or 116) may create between nose roll vacuum chamber 132 and the exterior of vacuum nose roll 150. This reduced pressure differential equates to a reduced suction force at the surface of vacuum nose roll 150. Additionally, the specific configuration of sealing member 161 and of recesses 157 and surfaces 159 on vacuum nose roll 150 as shown in FIG. 4 may be termed a labyrinth seal. In this configuration, as vacuum nose roll 150 spins about nose roll shaft 152, air becomes trapped within recesses 157 as they pass by sealing member 161. These trapped pockets of air further help to impede any airflow from outside of vacuum nose roll 150 into airflow conduit 113 from between vacuum nose roll 150 and sealing member 161 due to the relatively lower pressure within airflow conduit 113.

In order to form an effective labyrinth seal, the specific dimensions of recesses 157 and sealing member 161 may need to fall within particular boundaries. For instance, sealing member 161 has a surface 163 which may curve to follow the contour of vacuum nose roll 150. In some embodiments, surface 163 of sealing member 161 may have a contour length equal to between about 5% and about 25% of the circumference of vacuum nose roll 150. The contour length of surface 163 may be the length of surface 163 from the top of sealing member 167 to the bottom of sealing member 169, as seen in FIG. 4, found by following the curvature of the surface 163. Additionally, recesses 157 may have a maximum width of between about 0.5 mm and about 10 mm. In other embodiments, recesses 157 may have a width that is equal to portion of a circumferential length of vacuum nose roll 150. In some embodiments, recesses 157 may have a maximum width equal to between about 0.5% and about 5% of the circumference of vacuum nose roll 150. Ridges 156 may have a radial height of between about 2 mm and about 20 mm.

In some embodiments, the maximum width of ridges 156 may be the same as the maximum width of the recesses 157. However, this is not necessary in all embodiments. For instance, the maximum width of ridges 156 may range between about 50% and about 200% of the maximum width of the recesses 157 in different embodiments.

In some further embodiments, nose roll assembly 104 may further comprise recesses 168 disposed on nose roll shaft 152. Similar to recesses 157 and sealing member 161, recesses 168 and interior surface 151 of vacuum nose roll 150 may form a labyrinth seal to prevent air from entering nose roll vacuum chamber 132 and/or airflow conduit 113 from between vacuum nose roll 150 and nose roll shaft 152. In different embodiments, recesses 168 may vary in depth between about 2 mm and about 20 mm. Additionally, recesses 168 may have a maximum width that ranges from about 0.5 mm to about 10 mm in different contemplated embodiments.

Figure 5:
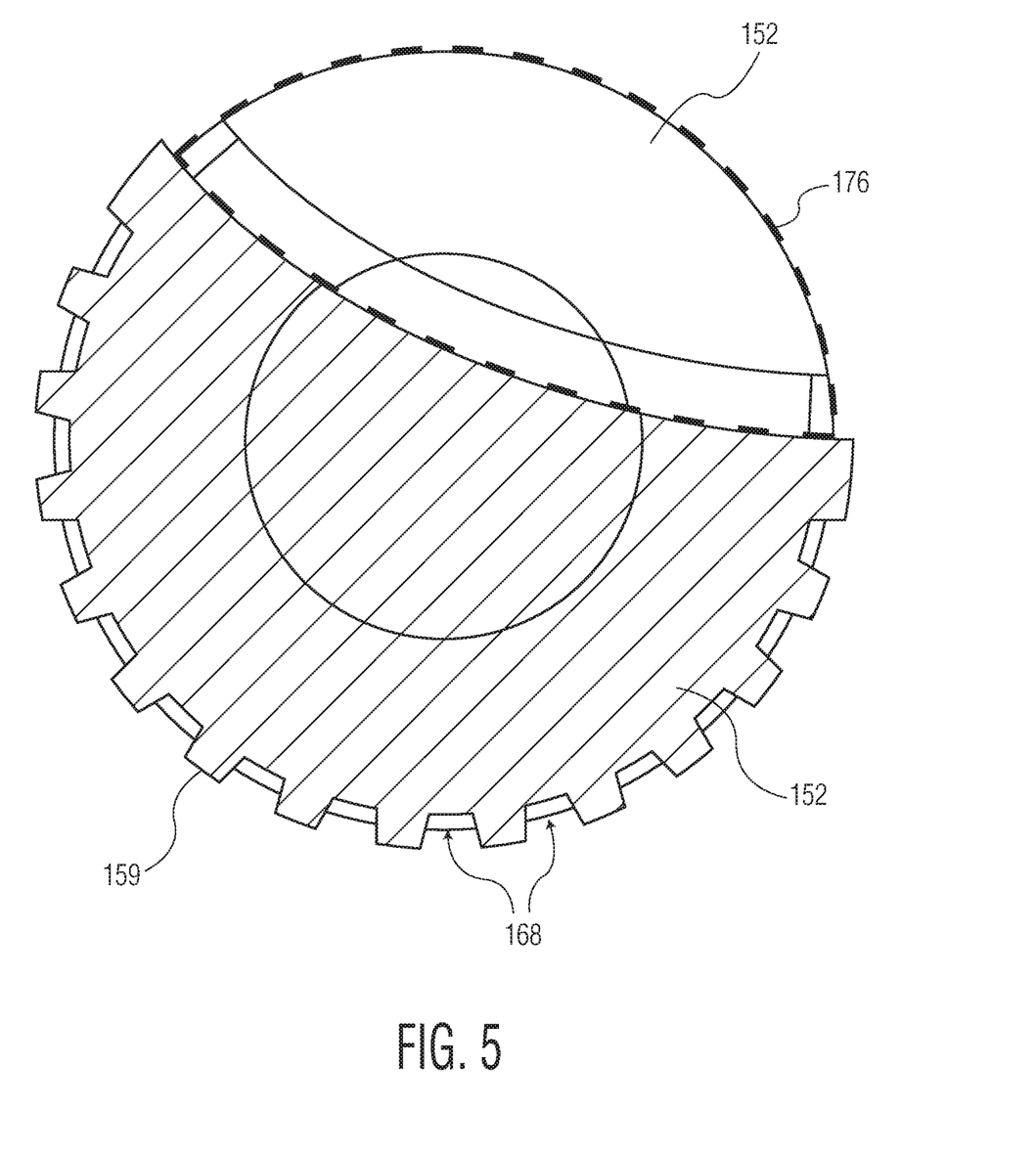
FIG. 5 is a cross-section view of a nose roll shaft of the nose roll assembly of FIG. 3 taken along line 4-4.

Nose roll vacuum chamber 132 may be formed of a recess within nose roll shaft 152. For example, a portion of nose roll shaft 152 not comprising the recess forming nose roll vacuum chamber 132 may have a first cross-sectional surface area, which comprises the area bounded by surfaces 159 of nose roll shaft 152 as shown in FIG. 5. Further, nose roll shaft 152 may have a second cross-sectional surface area at a portion of nose roll shaft 152 comprising the recess forming nose roll vacuum chamber 132. In the example of FIG. 5, this second cross-sectional surface area would be the first cross-sectional surface area less the region bounded by dotted line 176 defining the recess forming nose roll vacuum chamber 132. In at least some embodiments, the second cross-sectional surface area may be between about 50% and about 75% of the first cross-sectional surface area. As some illustrative examples, the first cross-sectional surface area may be between about 10 in$^2$ (64.5 cm$^2$) and about 150 in$^2$ (968 cm$^2$). Accordingly, the second cross-sectional surface area may then be between about 5 in$^2$ (32.2 cm$^2$) and about 112.5 in$^2$ (726 cm$^2$). This would put the cross-sectional area of the region forming nose roll vacuum chamber 132, e.g. the region bounded by dotted line 176, between about 25% percent and about 50% of the first cross-sectional area. Using the exemplary area values above, this means the cross-sectional area of the region forming nose roll vacuum chamber 132 may be between about 0.5 in$^2$ (3.2 cm$^2$) and about 52.5 in$^2$ (339 cm$^2$). However, it should be understood that these are only exemplary values. In other contemplated embodiments, nose roll 150 and nose roll shaft 152 may be as large or small as necessary for whatever particular desired application of vacuum conveyer system 100.

In at least some embodiments, nose roll shaft 152 may have a further feature where nose roll vacuum chamber 132 is substantially free of obstructions. The more open and smooth nose roll vacuum chamber 132 is, the less turbulence will be introduced to air entering nose roll vacuum chamber 132. Lower turbulence of air present in nose roll vacuum chamber 132 equates to lower levels of pressure able to be achieved by vacuum source 114 (and/or 116) given a static amount of vacuum energy supplied by vacuum source 114 (and/or 116). Accordingly, if nose roll vacuum chamber 132 is substantially free of obstructions, the greater the suction force may be achieved at nose roll surface 155 than where nose roll vacuum chamber 132 is not substantially free of obstructions. The phrase 'substantially free of obstructions' may be construed to mean there are no portions of nose roll shaft 152 or hardware or other members attached to nose roll shaft 152 which extend into nose roll vacuum chamber 132 an amount greater than about 10 mm.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A vacuum conveyer system comprising:
a vacuum box extending between a first box end and a second box end and comprising a first discrete vacuum chamber;
a nose roll disposed adjacent to the first box end and comprising a second discrete vacuum chamber; and
a foraminous member disposed about both of the nose roll and the vacuum box,
wherein the nose roll comprises a dead shaft and a live roll, and wherein a recess within the dead shaft forms the second discrete vacuum chamber.

2. The system of claim 1, wherein a single vacuum source supplies a vacuum to both the first discrete vacuum chamber and the second discrete vacuum chamber.

3. The system of claim 1, wherein a first vacuum source supplies a vacuum to the first discrete vacuum chamber and wherein a second vacuum source supplies a vacuum to the second discrete vacuum chamber.

4. The system of claim 1, wherein the second discrete vacuum chamber is external to the first discrete vacuum chamber.

5. The system of claim 1, wherein the first box end comprises an inlet end of the vacuum conveyer system.

6. The system of claim 1, wherein the second discrete vacuum chamber is substantially free of obstructions.

7. The system of claim 1, wherein a cross-sectional area of a region bounded by the recess comprises between about 25% and about 50% of a cross-sectional area of a portion of the dead shaft not comprising the recess.

8. The system of claim 1, wherein the live roll comprises a plurality of apertures to allow airflow into the second discrete vacuum chamber, and wherein the apertures are chamfered.

9. The system of claim 1, further comprising:
an airflow conduit disposed adjacent to the live roll; and a labyrinth seal connecting the live roll to the airflow conduit.

10. A vacuum conveyer system comprising:
a vacuum box extending between a first box end and a second box end, the vacuum box comprising a vacuum box vacuum chamber;
a nose roll disposed adjacent to the first box end, the nose roll comprising a nose roll vacuum chamber;
a foraminous member disposed about both of the nose roll and the vacuum box;
a first discrete airflow conduit connecting the vacuum box vacuum chamber to a vacuum source;
a second discrete airflow conduit connecting the nose roll vacuum chamber to the vacuum source,
wherein the second discrete airflow conduit extends at least partially through the vacuum box vacuum chamber.

11. The system of claim 10, wherein the first discrete airflow conduit connects the vacuum box vacuum chamber to a first vacuum source, and wherein the second discrete airflow conduit connects the nose roll vacuum chamber to a second vacuum source that is separate from the first vacuum source.

12. The system of claim 10, further comprising a labyrinth seal between the second discrete airflow conduit and the nose roll.

13. The system of claim 12, wherein the labyrinth seal comprises a sealing member, and wherein the sealing member extends around the nose roll for a length equal to between 5% and 25% of the circumference of the nose roll.

14. The system of claim 10, wherein the second discrete airflow conduit comprises an adjustable inlet plate.

15. A vacuum conveyer system comprising:
a vacuum box extending between a first box end and a second box end, the vacuum box comprising a vacuum box vacuum chamber;
a nose roll disposed adjacent to the first box end, the nose roll comprising a nose roll vacuum chamber; and
a foraminous member disposed about both of the nose roll and the vacuum box, and
wherein the nose roll vacuum chamber is substantially free of obstructions, and
wherein the nose roll comprises a dead shaft and a live roll, and wherein a recess within the dead shaft forms the nose roll vacuum chamber.

16. The system of claim 15, further comprising:
a first airflow conduit connecting the vacuum box vacuum chamber to a first vacuum source; and
a second airflow conduit connecting the nose roll vacuum chamber to either the first vacuum source or a second vacuum source.

17. The system of claim 15, wherein a cross-sectional area of a region bounded by the recess comprises between about 25% and about 50% of a cross-sectional area of a portion of the dead shaft not comprising the recess.

* * * * *